United States Patent [19]

Vinz

[11] Patent Number: 4,778,566
[45] Date of Patent: Oct. 18, 1988

[54] ENERGY-SAVING CIRCUIT FOR CONTINUOUSLY OPERATED DISTILLATION UNITS

[76] Inventor: Peter Vinz, Paosostrasse 24a, D-8000 München, Fed. Rep. of Germany, 60

[21] Appl. No.: 3,753

[22] Filed: Jan. 16, 1987

[30] Foreign Application Priority Data

Jan. 16, 1986 [DE] Fed. Rep. of Germany ........ 3601120
Jun. 12, 1986 [DE] Fed. Rep. of Germany ........ 3619707
Oct. 20, 1986 [DE] Fed. Rep. of Germany ........ 3635594

[51] Int. Cl.⁴ ............................................. B01D 3/14
[52] U.S. Cl. .................... 202/153; 202/159; 202/179; 202/198; 203/22; 203/87
[58] Field of Search ............... 202/153, 159, 179, 198; 203/23, 22, 87, 99, DIG. 19

[56] References Cited

U.S. PATENT DOCUMENTS

| | | | |
|---|---|---|---|
| 1,507,108 | 9/1924 | Cyphers | 202/159 |
| 3,073,752 | 1/1963 | Mention | 203/22 |
| 3,294,650 | 12/1966 | Manteufel | 203/87 |

Primary Examiner—Kenneth M. Schor
Attorney, Agent, or Firm—Miller & Gibbons

[57] ABSTRACT

The invention consists of an energy-saving circuit for rectification columns in continuously operated distillation plants and various embodiments of this circuit. Both the total dephlemation heat and the total waste heat of the depleted solution stream can be simultaneously utilized for preheating enriched initial solution by using this circuit, over a wide range of separations.

This heat recovery is possible using a parallel-flow dephlegmator whose vapor sides are connected in parallel to the rectification column enrichment section and which is preferably cooled by a portion of the cold enriched initial solution stream. From a partial stream of the vapor mixture existing at the beginning of the rectification column stripping section, product vapor of the required purity and condensate reflux for the vapor side of the unloaded column enrichment section are obtained simultaneously, in this manner.

8 Claims, 6 Drawing Sheets

ENERGY-SAVING CIRCUIT FOR CONTINUOUSLY OPERATED DISTILLATION UNITS

The invention deals with an energy-saving circuit for continuously operated distillation units, consisting of a rectification column having a stripping section and an enrichment section, a reboiler, which is connected, if need be, to the stripping section, a dephlegmator [or partial condenser], and a heat exchanger, through one side of which the enriched initial solution flows and through the other side of which the depleted solution from the reboiler flows, so that the enriched initial solution is fed continuously into the transition zone between the stripping and enrichment sections of the rectification column.

Rectifying devices are required in distillation units of this type if the liquid mixture to be separated contains as the solvent a liquid component whose vapor pressure cannot be neglected as compared to the more readily boiling product, and if, in addition, the greatest separation possible of the liquid mixture is desired, and if the required product is to be obtained at a given purity and in finite quantities in a continuous process. In such a case, rectification devices replace multiple distillations, over a sequence of concentrations. They thus reduce equipment costs and energy consumption associated with liquid mixture separation. Nevertheless, the separation energy required can be significant for extremely high product purities, as can also be the equipment costs, particularly if liquid mixtures are to be separated having the lowest possible product concentrations, or if the partial pressures of the mixture components which are to be separated are almost equal.

Rectification devices with these characteristics for liquid mixture separation generally consist of a connected rectifying column having a stripping section and an enrichment section and a reflux cooler (dephlegmator) connected ahead of the [main] condenser. This equipment is connected to the heated reboiler in the sequence given. This circuit is very common in distillation technology, and has been described extensively in the literature.

The concept of reducing separation cost by utilizing the cooling potential of the cold excess flow rate of enriched initial solution by means of an improved rectification device, is not new. Attempts to do this, which have become known, have however, finally foundered, because important physical laws of the liquid mixture separation process were not observed.

Thus, a circuit was described in a presentation at the Refrigeration Conference, Nurenberg, 1974, in which the excess flow rate of enriched initial solution is separated ahead of the heat exchanger and recycled to the rectification column on an intermediate plate in the enrichment section. German Patent No. 2,849,076, moreover, discloses a rectifying device in which the excess flow of enriched initial solution returned separately to the head of the column enrichment section, and which then flow down a pipe which keeps the media separated within the column to the feed location for the residual flow of enriched initial solution which was heated in the heat exchanger, whereby the excess flow would be heated up to the temperature of the residual flow.

The deficiency in the first case involves the fact that two solution flows having different rectification potentials become mixed—the dephlegmator reflux and the cold excess flow of enriched solution. At their point of mixing, i.e., before their mixing, both solution flows having different concentrations as well as different temperatures. The mixing process itself is exothermal, with a decrease in concentration and an increase in temperature in the streams which are flowing together. Thus, rectification potentials which are present in the streams which separate become neutralized.

Efficient utilization of the cooling potential of the cold excess flow of enriched initial solution for concentration the vapor mixture is possible with this circuit only under one condition. For this, the excess flow of intitial solution must, however, be returned to the top of the rectifying column enrichment section, and, moreover, the cooling potential must be checked as being adequate for the required concentration of the vapor potential.

In the most common separation processes, however, the vapor mixture can only be prerectified, and then further concentrated in an enrichment section connected downstream using condensate reflux involving energy loss.

In the second case, this excess flow of enriched initial solution becomes warmed in the column without contributing to rectification, so that the quantity of heat which it has picked up must also be delivered to the reboiler. The cold excess flow of enriched initial solution in this case could only contribute to rectification if one makes certain that it only subcools the dephlegmator reflux which is flowing downward in the same direction, or that it only condenses coolant vapor flowing countercurrent; in the latter case, purified coolant vapor does not thus come into further contact with the solution reflux. A mixed operation, i.e., cooling both the solution reflux as well as the coolant vapor, remains without effect, on the contrary.

The purpose of the invention is to provide an energy-saving circuit for the rectificatibn unit in a continuously operating distillation plant, with which—in addition to the total heat removed from the reboiler by the depleted solution—as much as possible of the total heat removed in the dephlegmator is also available for preheating the enriched initial solution.

This problem is solved according to one embodiment of the invention in which dephlegmator (3b) is connected on its vapor side in parallel with rectification column enrichment section (2b), and which is supplied with vapor from the transition zone between stripping and enrichment sections (2a and 2b), and in which the higher-boiling component is condensed out to reach a vapor concentration corresponding to the required product purity and is then mixed with top product from enrichment section (2b) and delivered to [main] condenser (5), while condensate formed in dephlegmator (3b) is returned as reflux to the top of enrichment section (2b).

According to another embodiment of the invention, a particularly advantageous embodiment of this circuit is provided if vapor drawn off from the transition zone between stripping and enrichment sections (2a and 2b) is passed through its own enrichment column (2c) before it enters dephlegmator (3b), and if the vapor is finally routed to the top of dephlegmator (3b) and flows downward in parallel with the condensing component, while dephlegmator coolant travels upward in countercurrent flow.

The full energy saving effect is displayed if, according to anothe embodiment of the invention, dephlegmator (3b) is cooled by the excess flow rate $(1' \cdot \xi_r')$ of cooled enriched initial solution, and if the residual flow rate $((f-1)' \cdot \xi_r')$ of cold initial solution takes up in the heat exchanger (4) all the heat being withdrawn from an equal quantity of depleted solution $((f-1)' \cdot \xi_a')$ being taken from reboiler (1).

According to another embodiment of the invention, it is especially advantageous if the excess flow rate $(1' \cdot \xi_r')$ of the enriched initial solution is returned as reflux to the top of enrichment section (2c) after it has been heated in dephlegmator (3b), and if the solution withdrawn from enrichment section (2c) is mixed together with the rsidual flow rate $((f-1)' \cdot \xi_r')$ of enriched initial solution which has been heated in heat exchanger (4) and routed to the beginning of rectification column stripping section (2a).

Moreover, according to another emdodiment of the invention, it can be advantageous if the top of enrichment section (2c) is supplied with solution withdrawn from enrichment section (2b), and if the excess flow rate $(1' \cdot \xi_r')$ of enriched initial sol has been heated in dephlegmator (3b) is combined with the residual flow rate $((f-1)' \cdot \xi_r')$ of enriched initial solution which has been heated in the heat exchanger (4) and is routed to the beginning of rectification column stripping section (2a).

Although the dephlegmator coolant stream has the concentration of the enriched initial solution in prior-art distillation processes, it can also acquire a higher concentration in distillation processes operated in a closed circuit. The question as to which solution stream is most suitable as top feed for enrichment section (2c)—the dephlegmator coolant stream or the solution withdrawn from enrichment section (2b)—depends in each case on the liquid mixture system which is to be separated and on present concentrations, and can thus only be decided by calculations for each specific case.

For this connected-in-parallel concentrating of product vapor, which is possible with the energy-saving circuit, the total cooling potential of the excess flow rate $(1' \cdot \xi_r')$ of the cold enriched initial solution is available in each and every case, since only the residual flow rate $((f-1)' \cdot \xi_r')$ of cold enriched initial solution is necessary in order to receive the total heat being withdrawn in heat exchanger (4) from reboiler depleted solution flow rate $((f-1)' \cdot \xi_a')$.

Thus, the depleted solution $((f-1)' \cdot \xi_a')$ in reboiler (1) can be cooled in heat exchanger (4) to several degrees above the temperature of the cold enriched initial solution $(f' \cdot \xi_r')$ it is assumed that the material streams exchanging heat have approximately equal values of $c_p$).

By virtue of the cooling potential of the excess flow rate $(1' \cdot \xi_r')$ of the cold initial solution both a portion of product vapor as well as condensate can be recovered in parallel-flow dephlegmator (3b) to satisfy condensate reflux requirements of enrichment section (2b), connected in parallel. That is, both products of parallel-flow dephlegmator (3b) relieve [or unload] the rectifying column enrichment section (2b), and thus also the fraction of heat which has to be removed from it. The products thus recovered from parallel-flow dephlegmator (3b) enable operating the rectification enrichment section (2b) without heat removal, over certain concentration range.

Energy-saving circuits can thus be provided for most varied liquid mixture separation processes, for which—in addition to the total waste heat potential of the depleted solution flow rate $((f-1)' \cdot \xi_a')$—the cooling potential of the still available cold excess flow rate of enriched initial solution $(1' \cdot \xi_r')$ can be efficiently used for rectification of product vapor.

These different embodiments of the energy-saving circuit are further explained using the illustrations (FIG. 1 to FIG. 6).

DESIGNATIONS USED IN THE FIGURES

1 Reboiler
2a Stripping section of rectification device
2b Enrichment section of rectification device
2c Supplemental enrichment section of rectification device
3a Countercurrent-flow dephlegmator
3b Parallel-flow dephlegmator (cooled by initial solution)
3c Parallel-flow dephlegmator (foreign coolant)
4 Heat exchanger
5 Condenser
6a Absorber stage 1
6b Absorber stage 2

NOMENCLATURE f Solution feed or solution circulation
f−1 Solution withdrawn
1 Product withdrawn
R Condensate reflux
X Fraction of product take-off
ξ Concentration

INDICES p Product
a Depleted
r Enriched
rr Enriched twice
′ Liquid
″ Vapor

Figure 1:
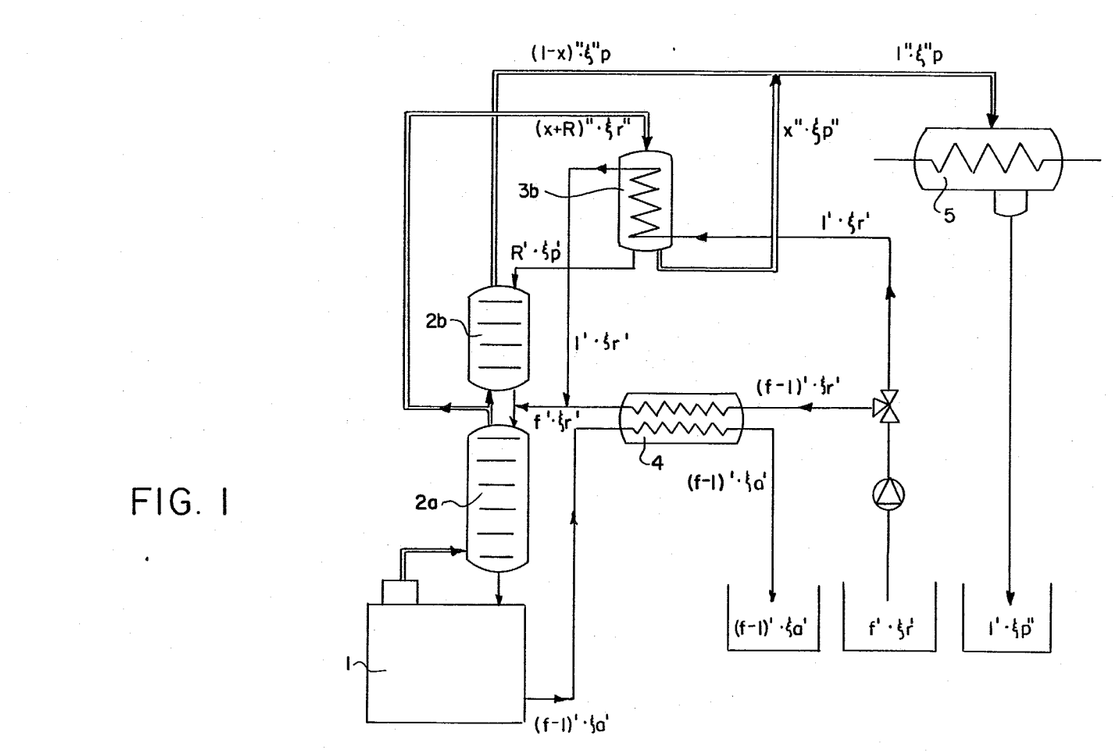
FIG. 1. Energy-saving circuit in its basic embodiment.

FIG. 1 shows the basic form of the energy-saving circuit. Here, the vapor side of reboiler (1) is connected to the rectifying column (stripping section 2a and enrichment section 2b); dephlegmator (3b) and condenser (5) are connected thereto in series. Dephlegmator (3b) in turn is connected in parallel on the vapor side with enrichment section (2b) of the rectifying column, and it is supplied with the partial vapor quantity $((x+R)'' \cdot \xi_r'')$ from the transition zone between the rectification column stripping and enrichment sections (2a and 2b).

The partial stream $((x+R)'' \cdot \xi_r'')$ is recycled to the top of dephlegmator (3b), and travels here in parallel flow with the condensing component $(R' \cdot \xi_p')$. The component which is condensing ($R' \cdot \xi_p'$) is collected, and fed as reflux to the top of enrichment section (2b); here it flows downward countercurrent to the partial vapor mixture which is streaming upward. The dephlegmator product vapor stream ($x'' \cdot \xi_p''$) is combined with the enrichment section stream (($1-x)'' \cdot \xi_r''$), and they flow together to condenser (5) to be liquefied. The depleted solution stream (($f-1)' \cdot \xi_a'$) leaves reboiler (1) at the reboiler sump and flows countercurrent to an equal quantity of enriched initial solution partial flow rate (($f-1)' \cdot \xi_r'$) through heat exchanger (4). Excess flow rate ($1' \cdot \xi_r'$) of cold initial solution serves as dephlegmator coolant, and flows into dephlegmator (3b) countercurrent to the condensing vapor mixture (($x+R)'' \cdot \xi_r''$). The residual flow rate (($f-1)'' \cdot \xi_r'$) of enriched initial solution, which is heated in heat exchanger (4), is finally combined with the excess flow rate ($1' \cdot \xi_r'$) heated in the dephlegmator, and routed to the top of stripping section (2a) in the rectification column.

Product streams ($R' \cdot \xi_p'$) and ($x'' \cdot \xi_p''$) from dephlegmator (3b) both unload the rectification column enrichment section (2b). Product vapor concentrating can be performed without any foreign cooling, over a wide range of separations, and only the heat of vaporization of the product being concentrated has to be provided from outside for liquid mixture separation.

Figure 2:
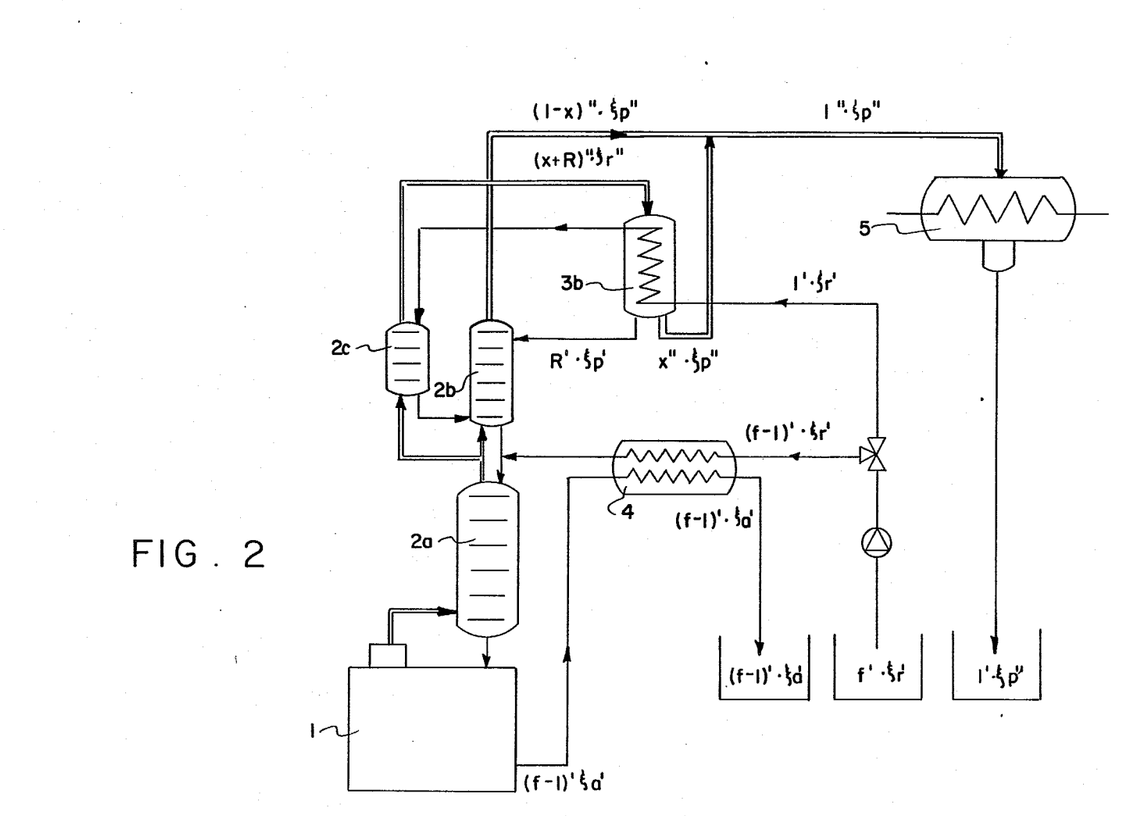
FIG. 2. Energy-saving circuit with supplemental enrichment section (2c). (Top feed of dephlegmator coolant).

FIG. 2 shows an energy-saving circuit with supplemental enrichment section (2c). This enrichment section (2c) is supplied with a vapor mixture withdrawn from the transition zone between stripping and enrichment sections (2a) and (2b) before it enters dephlegmator (3b). The excess flow rate ($1' \cdot \xi_r'$) of enriched initial solution which is heated in dephlegmator (3b) is delivered as reflux to enrichment section (2c). The solution withdrawn from enrichment section (2c) is routed to a location in the rectification column having the same concentration. The vapor mixture being fed to the dephlegmator (3b) can be stabilized with regard to concentration before its entry, using this circuit.

Figure 3:
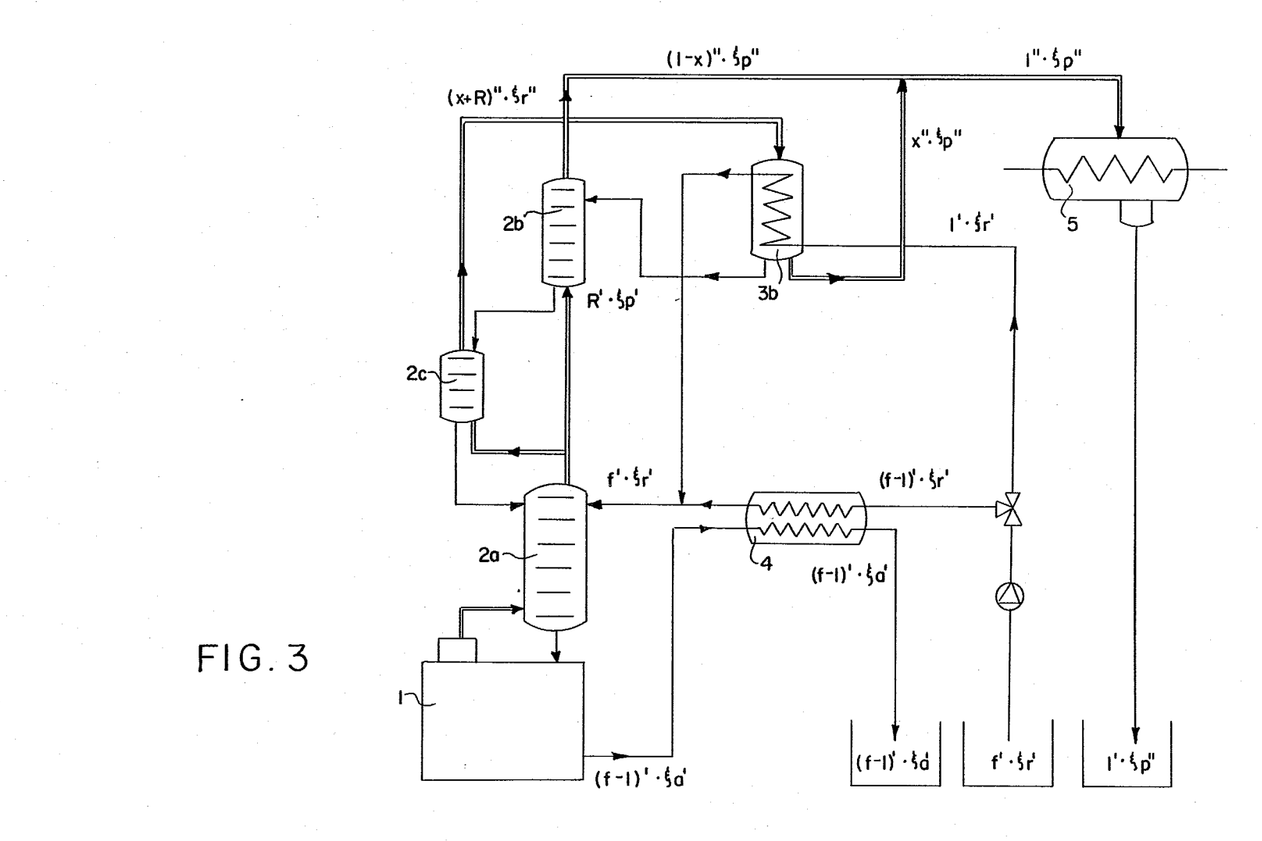
FIG. 3. Energy-saving circuit with supplemental enrichment section (2c). (Top feed of solution withdrawn from enrichment section (2b)).

FIG. 3 shows the same equipment construction as in the circuit according to FIG. 2, however, enrichment section (2c) is connected here to the solution discharge (2b) as reflux, and the excess flow rate ($1' \cdot \xi_r'$), which is heated in the dephlegmator, an the residual flow rate (($f-1)' \cdot \xi_r'$), which is heated in heat exchanger (4), are recycled together to the top of rectification column stripping section (2a), while solution withdrawn from enrichment section (2c) is supplied to a location in the rectification column having the same concentration.

Figure 4:
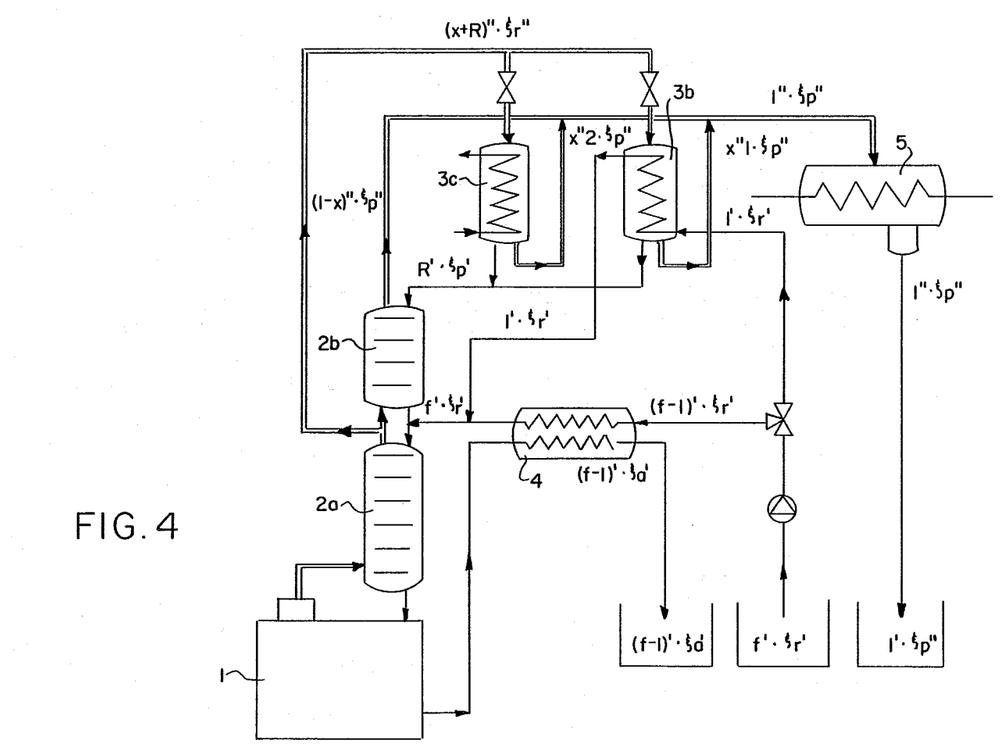
FIG. 4. Energy-saving circuit with parallel dephlegmation, using foreign coolant.

FIG. 4 shows an energy-saving circuit for separating a liquid mixture in which the cooling potential of the excess flow rate ($1' \cdot \xi_r'$) of enriched initial solution is in fact sufficient to maintain the required product purity, but not sufficient to cover condensate reflux requirements for enrichment section (2b). Another dephlegmator (3c) of the same type but using a foreign coolant is required in this case, together with parallel-flow dephlegmator (3b) cooled by the solution. The condensate quantities from both pieces of equipment (3b, 3c) collectively cover the condensate reflux requirements of enrichment section (2b), and this is returned to the top of the rectification column enrichment section.

Figure 5:
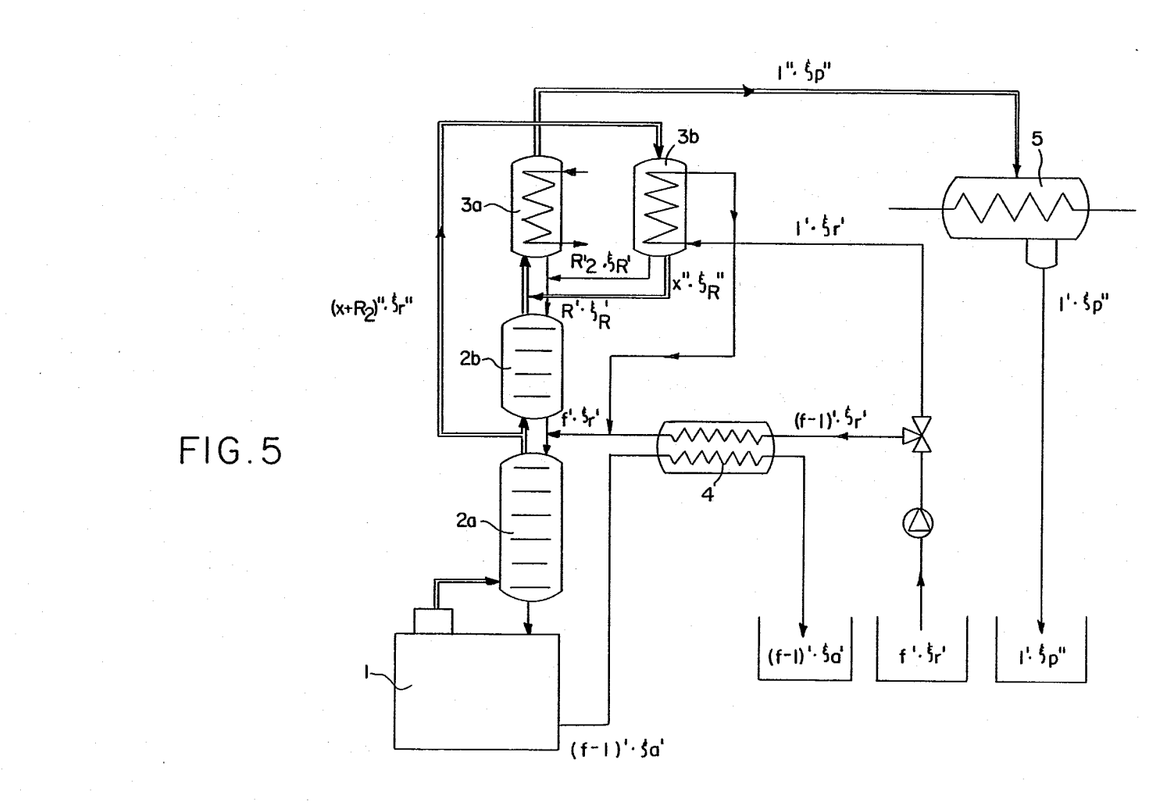
FIG. 5. Energy-saving circuit with series dephlegmation, using foreign coolant.

For the case in which condensate concentration at the exit of parallel-flow dephlegmators (3b, 3c) is too low for attaining product purity in enrichment section (2b), the vapor sides of these units connected in parallel (3b, 3c) are connected to a separate countercurrent dephlegmator (3a), using foreign coolant. This energy-saving circuit is illustrated in FIG. 5.

Figure 6:
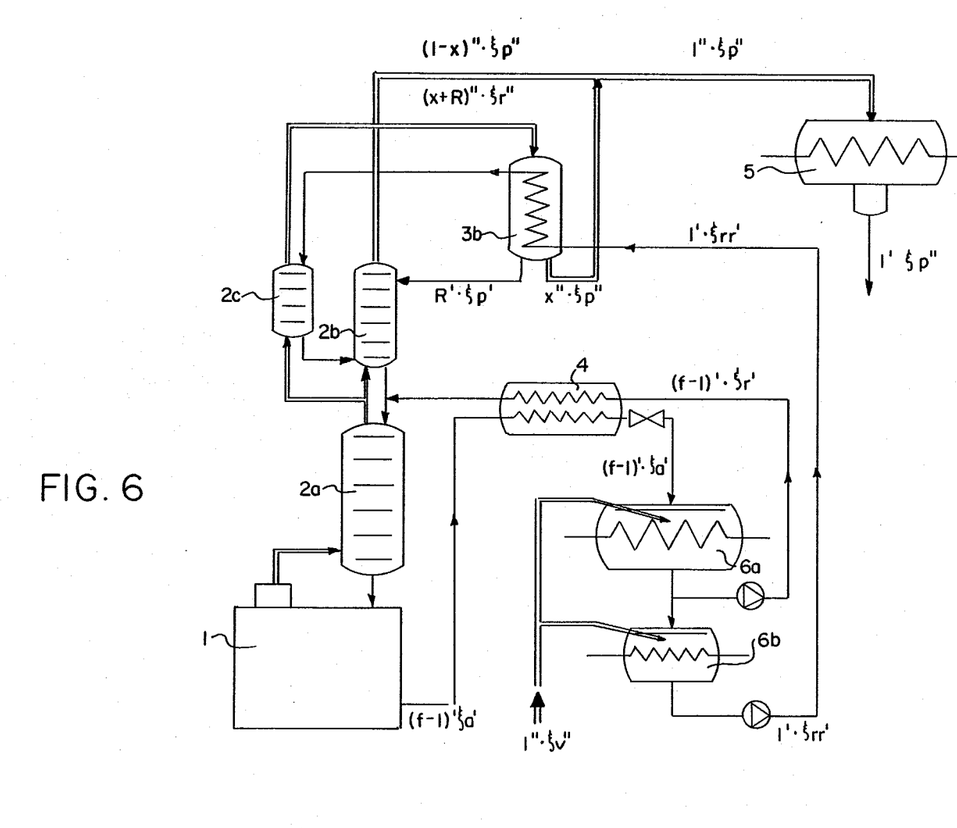
FIG. 6. Energy-saving circuit for industrial $NH_3$-$H_2O$ absorption refrigeration circuit.

FIG. 6 shows an energy-saving circuit especially intended for separating mixtures in a closed liquid circuit, for example, for the ammonia/water absorption cooling process. Use of this circuit is particularly advantageous for heat pumps and refrigeration plants with waste heat decoupling at higher coolant temperatures.

Waste heat decoupling at higher coolant temperatures requires cyclic operation with high condenser pressure (25-30 bar) and reduced final enrichment concentration in the absorber (0.2 to 0.25); dephlegmator heat for rectifying the vapor mixture increases significantly because of this.

In this case, the cooling potential of the dephlegmator cooling agent stream can be matched using supplemental cold vapor enrichment in absorber (6a, 6b) without loss of increased waste heat production in the rectification devices, and connecting a parallel-flow dephlegmator (3c) cooled by a foreign coolant can thus be foregone.

Cold vapor absorption exists here with stepped concentrations, involving two pressure-matched absorption vessels (6a, 6b) connected in series on the solution side. After the first absorption stage (6a), the partially enriched main solution stream (($f-1)' \cdot \xi_r'$) is drawn off; it flows counter-current to depleted solution stream ($f-1)' \cdot \xi_a'$ through heat exchanger (4), and is then delivered to the beginning of rectification column stripping section (2a). The excess flow of partially enriched solution is then, on the contrary, concentrated in the second absorption stage (6b) to the amount ($1' \cdot \xi_{rr}'$); it is finally delivered to dephlegmator (3b), and, after being heated, flows to the top of rectifying column enrichment section (2c).

With this concentration-stepped solution enrichment in the absorbers, not only can the cooling potential of the dephlegmator coolant be used for waste heat recovery in the rectification column, but the foreign coolant exit temperature from the unit can also be increased, without increasing plant energy consumption.

What is claimed is:

1. An energy savings circuit for a continously operated distillation plant comprising: a rectification column having a stripping section (2a) and an enrichment section (2b); introduction for introducing a fluid into said stripping section; removal means for removing fluid from said enrichment section; a reboiler (1); means connecting said reboiler to said stripping section; a heat exchanger (4); means connecting said heat exchanger to said reboiler and to said stripping section; means connecting said enrichment section to said stripping section; a dephelgmator (3b) having a vapor side and a liquid condensate side; a transition zone between said stripping section (2a) and said enrichment section (2b); dephlegmator introduction means for introducing into said dephlegmator vapor from said transition zone; means for passing liquid condensate from said dephelgmator (3b) to the top of said enrichment section (2b); a condenser (5); means for passing a vapor product from said enrichment section removal means to said condenser; and means for passing a vapor product from said dephlegmator to said condenser.

2. The energy saving circuit of claim 1, wherein said dephlegmator introduction means comprises a separate enrichment section (2c), and means for passing vapor withdrawn from said transition zone to said separate enrichment section (2c); and means for passing vapor from said separate enrichment section (2c) to said dephlegmator.

3. An energy-saving circuit according to claim 1, wherein the dephlegmator (3b) is structured such that vapor supplied to the top of dephlegmator (3b) travels in parallel flow downward with the component being condensed, while the coolant for this travels upward in countercurrent flow.

4. An energy-saving circuit according to claim 1, including a means for providing a cold initial solution and wherein the circuit is provided with structure such that dephlegmator (3b) is cooled by a partial stream $(1' \cdot \xi_r')$ taken from the cold initial solution while the remaining cold initial solution $((f-1)' \cdot \xi_r')$ flows through heat exchanger (4) countercurrent to an equal amount of depleted solution taken from reboiler (1) $((f-1)' \cdot \xi_a')$ via a means for flowing said depleted solution from said reboiler (1) to said heat exchanger (4).

5. An energy-saving circuit according to claim 2, including means to provide dephlegmator coolant following its heating as reflux at the top of enrichment section (2c), and means for providing the solution withdrawn from enrichment section (2c) together with the reisdual stream $((f-1)' \cdot \xi_r')$ of intial solution which has been heated in heat exchanger (4) toghether to the beginning of rectification column stripping section (2a).

6. An energy-saving circuit according to claim 2, wherein connection means are provided such that the liquid withdrawn from enrichment section (2b) is used as top feed for enrichment section (2c), and means are provided such that the initial solution partial stream is heated in dephelegmator (3b) and residual initial solution stream is heated in the heat exchanger, and such that both are supplied to the beginning of rectification column stripping section (2a).

7. An energy-saving circuit according to claim 1, wherein another dephlegmator (3c) is connected in parallel to dephlegmator (3b), and wherein means are provided to cool this parallel-connected dephlegmator (3c) by a supplemental coolant.

8. An energy-saving circuit according to claim 1, including means for mixing the rectification column top product, before entering a dephlegmator (3a) with partly-concentrated vapor from a supplemental dephlegmator (3b) for further concentration, and including means to supply components condensed out in both dephlegmators (3a, 3b) as reflux to the top of enrichment section (2b).

* * * * *